United States Patent
Chosack et al.

(10) Patent No.: US 9,501,955 B2
(45) Date of Patent: Nov. 22, 2016

(54) ENDOSCOPIC ULTRASONOGRAPHY SIMULATION

(75) Inventors: Edna Chosack, Orange, OH (US); David Barkay, Kiryat Ono (IL); Ran Bronstein, Modi'in (IL); Niv Fisher, Herzlia (IL)

(73) Assignee: SIMBIONIX LTD., Airport (IL)

(*) Notice: Subject to any disclaimer, the term of this patent is extended or adjusted under 35 U.S.C. 154(b) by 867 days.

(21) Appl. No.: 10/477,513

(22) PCT Filed: May 20, 2002

(86) PCT No.: PCT/IL02/00393
§ 371 (c)(1),
(2), (4) Date: Aug. 6, 2004

(87) PCT Pub. No.: WO02/094080
PCT Pub. Date: Nov. 28, 2002

(65) Prior Publication Data
US 2004/0253572 A1 Dec. 16, 2004

(30) Foreign Application Priority Data
May 20, 2001 (IL) .......................................... 143255

(51) Int. Cl.
*G09B 23/28* (2006.01)
(52) U.S. Cl.
CPC .................... *G09B 23/285* (2013.01)
(58) Field of Classification Search
CPC .................................................... G09B 23/38
USPC ............ 434/219, 262, 267, 269, 272, 307 R, 434/308, 365, 268; 600/373, 407, 411, 437, 600/439, 443, 447, 449, 508, 427; 128/898; 73/626, 1.86; 433/24; 382/128, 173, 382/154; 324/318; 378/65
See application file for complete search history.

(56) References Cited

U.S. PATENT DOCUMENTS 1,959,490 A 5/1934 Mistelski
3,024,539 A 3/1962 Rider
(Continued)

FOREIGN PATENT DOCUMENTS

EP 0 147 516 3/1988
EP 0 265 011 4/1988
(Continued)

OTHER PUBLICATIONS

Yoshitaka, Adachi et al. Intermediate Interpretation for Stiff Virtual Objects Proceedings of the Virtual Reality Annual International Symposium (VRAIS' 95) Technical Research Center, Suzuki Motor Corporation, Yokohama, Japan.
(Continued)

*Primary Examiner* — Xuan Thai
*Assistant Examiner* — Robert P Bullington
(74) *Attorney, Agent, or Firm* — Pearl Cohen Zedek Latzer Baratz LLP

(57) ABSTRACT

A method and a system to simulate ultrasound images and hence for simulating the evaluation of a subject with such images as a diagnostic tool. For the purpose of simulating ultrasound images, these images may be considered to be planar slices of a given geometry. These slices are generated from the surface geometry of the portion of the subject which would receive the ultrasound waves if the ultrasound diagnostic procedure was actually be performed. Simulating such ultrasound images may therefore be performed by determining such images from surface models, and then rendering those ultrasound images at the desired position. The rendering of such simulated ultrasound images also optionally and preferably includes the simulation of the "grainy" quality of such images.

11 Claims, 6 Drawing Sheets

(56) References Cited

U.S. PATENT DOCUMENTS

| | | | |
|---|---|---|---|
| 3,263,824 A | 8/1966 | Jones et al. |
| 3,406,601 A | 10/1968 | Clifford |
| 3,490,059 A | 1/1970 | Paulsen et al. |
| 3,517,446 A | 6/1970 | Corlyon et al. |
| 3,520,071 A | 7/1970 | Abrahamson et al. |
| 3,573,444 A | 4/1971 | Kawabata et al. |
| 3,579,842 A | 5/1971 | Scher |
| 3,704,529 A | 12/1972 | Cioppa |
| 3,722,108 A | 3/1973 | Chase |
| 3,739,276 A | 6/1973 | Dornberger |
| 3,775,865 A | 12/1973 | Rowan |
| 3,789,518 A | 2/1974 | Chase |
| 3,795,061 A | 3/1974 | Sarnoff et al. |
| 3,795,150 A | 3/1974 | Eckhardt |
| 3,814,145 A | 6/1974 | Gott et al. |
| 3,861,065 A | 1/1975 | Courtenay et al. |
| 3,875,488 A | 4/1975 | Crocker et al. |
| 3,919,691 A | 11/1975 | Noll |
| 3,945,593 A | 3/1976 | Schanzer |
| 3,991,490 A | 11/1976 | Markman |
| 4,024,473 A | 5/1977 | Edge et al. |
| 4,024,873 A | 5/1977 | Antoshkiw et al. |
| 4,033,331 A | 7/1977 | Guss et al. |
| 4,078,317 A | 3/1978 | Wheatley et al. |
| 4,089,494 A | 5/1978 | Anderson et al. |
| 4,115,755 A | 9/1978 | Cotton |
| 4,136,554 A | 1/1979 | Larson |
| 4,148,014 A | 4/1979 | Burson |
| 4,162,582 A | 7/1979 | McGraw et al. |
| 4,177,984 A | 12/1979 | Douglas et al. |
| 4,182,054 A | 1/1980 | Wise et al. |
| 4,183,249 A * | 1/1980 | Anderson | 73/626 |
| 4,227,319 A | 10/1980 | Guy et al. |
| 4,236,685 A | 12/1980 | Kissel |
| 4,250,636 A | 2/1981 | Horwitz |
| 4,250,887 A | 2/1981 | Dardik et al. |
| 4,262,549 A | 4/1981 | Schwellenbach |
| 4,264,312 A | 4/1981 | Cianci |
| 4,276,702 A | 7/1981 | Horwitz |
| 4,307,539 A | 12/1981 | Klein |
| 4,333,070 A | 6/1982 | Barnes |
| 4,334,216 A | 6/1982 | Lacroix |
| 4,360,345 A | 11/1982 | Hon |
| 4,398,889 A | 8/1983 | Lam et al. |
| 4,427,388 A | 1/1984 | Hope |
| 4,436,188 A | 3/1984 | Jones |
| 4,459,113 A | 7/1984 | Boscaro Gatti et al. |
| 4,464,117 A | 8/1984 | Foerst |
| 4,478,407 A | 10/1984 | Manabe |
| 4,481,001 A | 11/1984 | Graham et al. |
| 4,504,233 A | 3/1985 | Galus et al. |
| 4,513,235 A | 4/1985 | Acklam et al. |
| 4,545,390 A | 10/1985 | Leary |
| 4,550,617 A | 11/1985 | Fraignier et al. |
| 4,551,101 A | 11/1985 | Neumann |
| 4,573,452 A | 3/1986 | Greenberg |
| 4,599,070 A | 7/1986 | Hladky et al. |
| 4,604,016 A | 8/1986 | Joyce |
| 4,605,373 A | 8/1986 | Rosen |
| 4,632,341 A | 12/1986 | Repperger et al. |
| 4,642,055 A | 2/1987 | Saliterman |
| 4,646,742 A | 3/1987 | Packard et al. |
| 4,654,648 A | 3/1987 | Herrington et al. |
| 4,655,673 A | 4/1987 | Hawkes |
| 4,659,313 A | 4/1987 | Kuster et al. |
| 4,667,182 A | 5/1987 | Murphy |
| 4,688,983 A | 8/1987 | Lindbom |
| 4,706,006 A | 11/1987 | Solomon |
| 4,708,650 A | 11/1987 | Holewinski et al. |
| 4,708,656 A | 11/1987 | de Vries et al. |
| 4,712,101 A | 12/1987 | Culver |
| 4,713,007 A | 12/1987 | Alban |
| 4,726,772 A | 2/1988 | Amplatz |
| 4,733,214 A | 3/1988 | Andresen |
| 4,742,815 A | 5/1988 | Ninan et al. |
| 4,748,984 A | 6/1988 | Patel |
| 4,751,662 A | 6/1988 | Crosbie |
| 4,757,302 A | 7/1988 | Hatakeyama et al. |
| 4,769,763 A | 9/1988 | Trieb et al. |
| 4,775,289 A | 10/1988 | Kazerooni |
| 4,782,327 A | 11/1988 | Kley et al. |
| 4,786,892 A | 11/1988 | Kubo et al. |
| 4,789,340 A | 12/1988 | Zikria |
| 4,794,384 A | 12/1988 | Jackson |
| 4,795,296 A | 1/1989 | Jau |
| 4,797,104 A | 1/1989 | Laerdal et al. |
| 4,803,413 A | 2/1989 | Kendig et al. |
| 4,820,162 A | 4/1989 | Ross |
| 4,823,634 A | 4/1989 | Culver |
| 4,825,875 A | 5/1989 | Ninan et al. |
| 4,839,838 A | 6/1989 | LaBiche et al. |
| 4,857,881 A | 8/1989 | Hayes |
| 4,860,215 A | 8/1989 | Seraji |
| 4,865,423 A | 9/1989 | Doi |
| 4,867,685 A | 9/1989 | Brush et al. |
| 4,868,549 A | 9/1989 | Affinito et al. |
| 4,870,964 A | 10/1989 | Bailey, Jr. et al. |
| 4,874,998 A | 10/1989 | Hollis, Jr. |
| H703 H | 11/1989 | Repperger et al. |
| 4,879,556 A | 11/1989 | Duimel |
| 4,881,324 A | 11/1989 | Khinchuk |
| 4,885,565 A | 12/1989 | Embach |
| 4,887,966 A | 12/1989 | Gellerman |
| 4,891,764 A | 1/1990 | McIntosh |
| 4,896,554 A | 1/1990 | Culver |
| 4,907,796 A | 3/1990 | Roel-Rodriguez |
| 4,907,970 A | 3/1990 | Meenen |
| 4,907,973 A * | 3/1990 | Hon | 434/262 |
| 4,909,232 A | 3/1990 | Carella |
| 4,912,638 A | 3/1990 | Pratt |
| 4,930,770 A | 6/1990 | Baker |
| 4,934,694 A | 6/1990 | McIntosh |
| 4,940,234 A | 7/1990 | Ishida et al. |
| 4,949,119 A | 8/1990 | Moncrief et al. |
| 4,955,654 A | 9/1990 | Tsuchihashi et al. |
| 4,961,138 A | 10/1990 | Gorniak |
| 4,961,267 A | 10/1990 | Herzog |
| 4,964,097 A | 10/1990 | Wang et al. |
| 4,975,546 A | 12/1990 | Craig |
| 4,982,618 A | 1/1991 | Culver |
| 4,982,918 A | 1/1991 | Kaye |
| 4,998,916 A | 3/1991 | Hammerslag et al. |
| 5,004,391 A | 4/1991 | Burdea |
| 5,007,300 A | 4/1991 | Siva |
| 5,009,598 A | 4/1991 | Bennington |
| 5,018,922 A | 5/1991 | Yoshinada et al. |
| 5,019,761 A | 5/1991 | Kraft |
| 5,021,982 A | 6/1991 | Crosbie et al. |
| 5,022,384 A | 6/1991 | Freels et al. |
| 5,033,352 A | 7/1991 | Kellogg et al. |
| 5,044,956 A | 9/1991 | Behensky et al. |
| 5,048,508 A | 9/1991 | Storz |
| 5,055,051 A * | 10/1991 | Duncan | 434/262 |
| 5,057,078 A | 10/1991 | Foote et al. |
| 5,062,594 A | 11/1991 | Repperger |
| 5,072,361 A | 12/1991 | Davis et al. |
| 5,077,769 A | 12/1991 | Franciose |
| 5,078,152 A | 1/1992 | Bond et al. |
| 5,086,296 A | 2/1992 | Clark |
| 5,103,404 A | 4/1992 | McIntosh |
| 5,104,328 A | 4/1992 | Lounsbury |
| 5,112,228 A | 5/1992 | Zouras |
| 5,116,051 A | 5/1992 | Moncrief et al. |
| 5,116,180 A | 5/1992 | Fung et al. |
| 5,125,843 A | 6/1992 | Holloway |
| 5,126,948 A | 6/1992 | Mitchell et al. |
| 5,135,488 A | 8/1992 | Foote et al. |
| 5,139,261 A | 8/1992 | Openiano |
| 5,142,931 A | 9/1992 | Menahem |
| 5,143,505 A | 9/1992 | Burdea et al. |
| 5,146,566 A | 9/1992 | Hollis, Jr. et al. |
| 5,149,270 A | 9/1992 | McKeown |
| 5,151,856 A * | 9/1992 | Halmann et al. | 600/508 |
| 5,153,716 A | 10/1992 | Smith |

(56) References Cited

U.S. PATENT DOCUMENTS

| | | | |
|---|---|---|---|
| 5,158,459 A | | 10/1992 | Edelberg |
| 5,167,159 A | | 12/1992 | Lucking |
| 5,171,299 A | | 12/1992 | Heitzmann et al. |
| 5,177,473 A | | 1/1993 | Drysdale |
| 5,180,351 A | | 1/1993 | Ehrenfried |
| 5,181,181 A | | 1/1993 | Glynn |
| 5,184,306 A | | 2/1993 | Erdman et al. |
| 5,184,319 A | | 2/1993 | Kramer |
| 5,185,561 A | | 2/1993 | Good et al. |
| 5,186,629 A | | 2/1993 | Rohen |
| 5,189,355 A | | 2/1993 | Larkins et al. |
| 5,191,320 A | | 3/1993 | MacKay |
| 5,193,963 A | | 3/1993 | McAffee et al. |
| 5,196,017 A | | 3/1993 | Silva et al. |
| 5,197,003 A | | 3/1993 | Moncrief et al. |
| 5,203,563 A | | 4/1993 | Loper, III |
| 5,204,600 A | | 4/1993 | Kahkoska |
| 5,209,131 A | | 5/1993 | Baxter |
| 5,209,661 A | | 5/1993 | Hildreth et al. |
| 5,212,473 A | | 5/1993 | Louis |
| 5,215,523 A | | 6/1993 | Williams et al. |
| 5,220,260 A | | 6/1993 | Schuler |
| 5,222,893 A | | 6/1993 | Hardesty |
| 5,223,776 A | | 6/1993 | Radke et al. |
| 5,228,356 A | | 7/1993 | Chuang |
| 5,230,339 A | * | 7/1993 | Charlebois .................. 600/437 |
| 5,240,417 A | | 8/1993 | Smithson et al. |
| 5,243,266 A | | 9/1993 | Kasagami et al. |
| 5,246,007 A | | 9/1993 | Frisbie et al. |
| 5,247,432 A | | 9/1993 | Ueda |
| 5,252,068 A | | 10/1993 | Gryder |
| 5,252,070 A | | 10/1993 | Jarrett |
| 5,257,462 A | | 11/1993 | Buttermann |
| 5,259,626 A | | 11/1993 | Ho |
| 5,259,894 A | | 11/1993 | Sampson |
| 5,264,768 A | | 11/1993 | Gregory et al. |
| 5,265,034 A | | 11/1993 | Breckenridge et al. |
| 5,269,519 A | | 12/1993 | Malone |
| 5,275,174 A | | 1/1994 | Cook |
| 5,275,565 A | | 1/1994 | Moncrief |
| 5,279,309 A | | 1/1994 | Taylor |
| 5,279,563 A | | 1/1994 | Brucker et al. |
| 5,280,265 A | | 1/1994 | Kramer et al. |
| 5,283,970 A | | 2/1994 | Aigner |
| 5,286,203 A | | 2/1994 | Fuller et al. |
| 5,295,694 A | | 3/1994 | Levin |
| 5,296,846 A | | 3/1994 | Ledley |
| 5,296,871 A | | 3/1994 | Paley |
| 5,305,203 A | | 4/1994 | Raab |
| 5,309,140 A | | 5/1994 | Everett, Jr. et al. |
| 5,311,422 A | | 5/1994 | Loftin et al. |
| 5,313,230 A | | 5/1994 | Venolia et al. |
| 5,313,568 A | | 5/1994 | Wallace et al. |
| 5,314,339 A | | 5/1994 | Aponte |
| 5,317,689 A | | 5/1994 | Nack et al. |
| 5,318,533 A | | 6/1994 | Adams et al. |
| 5,324,260 A | | 6/1994 | O'Neill et al. |
| 5,327,790 A | | 7/1994 | Levin et al. |
| 5,334,027 A | | 8/1994 | Wherlock |
| 5,335,557 A | | 8/1994 | Yasutake |
| 5,344,354 A | | 9/1994 | Wiley |
| 5,353,242 A | | 10/1994 | Crosbie et al. |
| 5,354,162 A | | 10/1994 | Burdea et al. |
| 5,355,148 A | | 10/1994 | Anderson |
| 5,364,271 A | | 11/1994 | Aknin et al. |
| 5,366,376 A | | 11/1994 | Copperman et al. |
| 5,368,478 A | * | 11/1994 | Andreiko et al. .............. 433/24 |
| 5,368,484 A | | 11/1994 | Copperman et al. |
| 5,368,487 A | | 11/1994 | Medina |
| 5,368,565 A | | 11/1994 | DeLong |
| 5,370,535 A | | 12/1994 | Prendergast |
| 5,379,663 A | | 1/1995 | Hara |
| 5,382,885 A | | 1/1995 | Salcudean et al. |
| 5,384,460 A | | 1/1995 | Tseng |
| 5,385,549 A | | 1/1995 | Lampropoulos et al. |
| 5,389,865 A | | 2/1995 | Jacobus et al. |
| 5,396,267 A | | 3/1995 | Bouton |
| 5,397,308 A | | 3/1995 | Ellis et al. |
| 5,397,323 A | | 3/1995 | Taylor et al. |
| 5,399,091 A | | 3/1995 | Mitsumoto |
| 5,402,801 A | | 4/1995 | Taylor |
| 5,403,191 A | * | 4/1995 | Tuason ........................ 434/262 |
| 5,412,189 A | | 5/1995 | Cragun |
| 5,412,880 A | | 5/1995 | Raab |
| 5,414,337 A | | 5/1995 | Schuler |
| 5,423,754 A | | 6/1995 | Cornelius et al. |
| 5,425,644 A | | 6/1995 | Szinicz |
| 5,425,709 A | | 6/1995 | Gambale |
| 5,428,748 A | | 6/1995 | Davidson et al. |
| 5,429,140 A | | 7/1995 | Burdea et al. |
| 5,430,665 A | | 7/1995 | Jin et al. |
| 5,436,640 A | | 7/1995 | Reeves |
| 5,437,290 A | * | 8/1995 | Bolger et al. ................. 128/898 |
| 5,445,166 A | | 8/1995 | Taylor |
| 5,451,924 A | | 9/1995 | Massimino et al. |
| 5,459,382 A | | 10/1995 | Jacobus et al. |
| 5,461,711 A | | 10/1995 | Wang et al. |
| 5,467,441 A | | 11/1995 | Stone et al. |
| 5,467,763 A | | 11/1995 | McMahon et al. |
| 5,470,232 A | | 11/1995 | Kelso et al. |
| 5,473,235 A | | 12/1995 | Lance et al. |
| 5,482,051 A | | 1/1996 | Reddy et al. |
| 5,492,530 A | | 2/1996 | Fischell et al. |
| 5,506,605 A | | 4/1996 | Paley |
| 5,512,919 A | | 4/1996 | Araki |
| 5,515,078 A | | 5/1996 | Greschler et al. |
| 5,524,637 A | | 6/1996 | Erickson |
| 5,541,831 A | | 7/1996 | Thomas |
| 5,542,672 A | | 8/1996 | Meredith |
| 5,542,676 A | | 8/1996 | Howe, Jr. et al. |
| 5,547,382 A | | 8/1996 | Yamasaki et al. |
| 5,548,694 A | | 8/1996 | Frisken |
| 5,553,198 A | | 9/1996 | Wang et al. |
| 5,559,412 A | | 9/1996 | Schuler |
| 5,565,840 A | | 10/1996 | Thorner et al. |
| 5,575,761 A | | 11/1996 | Hajianpour |
| 5,577,981 A | | 11/1996 | Jarvik |
| 5,580,249 A | | 12/1996 | Jacobsen et al. |
| 5,584,701 A | | 12/1996 | Lampotang et al. |
| 5,587,937 A | | 12/1996 | Massie et al. |
| 5,591,924 A | | 1/1997 | Hilton |
| 5,592,401 A | | 1/1997 | Kramer |
| 5,599,301 A | | 2/1997 | Jacobs et al. |
| 5,600,348 A | | 2/1997 | Bartholow et al. |
| 5,607,157 A | | 3/1997 | Nagashima |
| 5,607,308 A | | 3/1997 | Copperman et al. |
| 5,609,485 A | * | 3/1997 | Bergman et al. ............. 434/262 |
| 5,609,607 A | | 3/1997 | Hechtenberg et al. |
| 5,616,030 A | | 4/1997 | Watson |
| 5,623,582 A | | 4/1997 | Rosenberg |
| 5,625,551 A | | 4/1997 | Mitarai et al. |
| 5,625,576 A | | 4/1997 | Massie et al. |
| 5,629,594 A | | 5/1997 | Jacobus et al. |
| 5,631,861 A | | 5/1997 | Kramer |
| 5,631,973 A | | 5/1997 | Green |
| 5,643,087 A | | 7/1997 | Marcus et al. |
| 5,651,775 A | | 7/1997 | Walker et al. |
| 5,657,429 A | | 8/1997 | Wang et al. |
| 5,661,253 A | | 8/1997 | Aoki |
| 5,661,667 A | | 8/1997 | Rueb et al. |
| 5,666,473 A | | 9/1997 | Wallace |
| 5,669,818 A | | 9/1997 | Thorner et al. |
| 5,676,157 A | | 10/1997 | Kramer |
| 5,680,590 A | | 10/1997 | Parti |
| 5,684,722 A | | 11/1997 | Thorner et al. |
| 5,691,898 A | | 11/1997 | Rosenberg et al. |
| 5,694,013 A | | 12/1997 | Stewart et al. |
| 5,695,500 A | | 12/1997 | Taylor et al. |
| 5,701,140 A | | 12/1997 | Rosenberg et al. |
| 5,709,219 A | | 1/1998 | Chen et al. |
| 5,716,016 A | | 2/1998 | Iwade et al. |
| 5,720,619 A | | 2/1998 | Fisslinger |
| 5,722,403 A | * | 3/1998 | McGee et al. ................. 600/373 |
| 5,724,264 A | | 3/1998 | Rosenberg et al. |

(56) References Cited

U.S. PATENT DOCUMENTS

| | | | |
|---|---|---|---|
| 5,731,804 A | 3/1998 | Rosenberg | |
| 5,736,978 A | 4/1998 | Hasser et al. | |
| 5,739,811 A | 4/1998 | Rosenberg et al. | |
| 5,742,278 A | 4/1998 | Chen et al. | |
| 5,749,853 A | 5/1998 | O'Donnell et al. | |
| 5,755,577 A | 5/1998 | Gillio | |
| 5,758,649 A * | 6/1998 | Iwashita et al. | 600/459 |
| 5,766,016 A | 6/1998 | Sinclair et al. | |
| 5,768,413 A * | 6/1998 | Levin et al. | 382/173 |
| 5,769,640 A | 6/1998 | Jacobus et al. | |
| 5,771,181 A | 6/1998 | Moore et al. | |
| 5,776,050 A * | 7/1998 | Chen et al. | 600/117 |
| 5,776,126 A | 7/1998 | Wilk et al. | |
| 5,781,172 A | 7/1998 | Engel et al. | |
| 5,782,764 A * | 7/1998 | Werne | 600/411 |
| 5,797,900 A | 8/1998 | Madhani et al. | |
| 5,800,179 A | 9/1998 | Bailey | |
| 5,805,140 A | 9/1998 | Rosenberg et al. | |
| 5,806,521 A * | 9/1998 | Morimoto et al. | 600/447 |
| 5,807,377 A | 9/1998 | Madhani et al. | |
| 5,808,665 A | 9/1998 | Green | |
| 5,810,007 A * | 9/1998 | Holupka et al. | 600/439 |
| 5,821,920 A | 10/1998 | Rosenberg et al. | |
| 5,831,408 A | 11/1998 | Jacobus et al. | |
| 5,841,889 A * | 11/1998 | Seyed-Bolorforosh | 382/128 |
| 5,844,392 A | 12/1998 | Peurach et al. | |
| 5,882,206 A | 3/1999 | Gillio | |
| 5,889,670 A | 3/1999 | Schuler et al. | |
| 5,889,672 A | 3/1999 | Schuler et al. | |
| 5,930,741 A | 7/1999 | Kramer | |
| 5,945,978 A | 8/1999 | Holmes | |
| 5,956,484 A | 9/1999 | Rosenberg et al. | |
| 5,986,643 A | 11/1999 | Harvill et al. | |
| 5,999,185 A | 12/1999 | Kato et al. | |
| 6,004,134 A | 12/1999 | Marcus et al. | |
| 6,019,724 A * | 2/2000 | Gronningsaeter et al. | 600/439 |
| 6,024,576 A | 2/2000 | Bevirt et al. | |
| 6,037,927 A | 3/2000 | Rosenberg | |
| 6,038,488 A | 3/2000 | Barnes et al. | |
| 6,042,555 A | 3/2000 | Kramer et al. | |
| 6,050,962 A | 4/2000 | Kramer et al. | |
| 6,059,506 A | 5/2000 | Kramer | |
| 6,062,865 A | 5/2000 | Bailey | |
| 6,084,587 A | 7/2000 | Tarr et al. | |
| 6,088,017 A | 7/2000 | Tremblay et al. | |
| 6,104,379 A | 8/2000 | Petrich et al. | |
| 6,110,130 A | 8/2000 | Kramer | |
| 6,111,577 A | 8/2000 | Zilles et al. | |
| 6,117,078 A * | 9/2000 | Lysyansky et al. | 600/437 |
| 6,120,465 A | 9/2000 | Guthrie et al. | |
| 6,148,280 A | 11/2000 | Kramer | |
| 6,157,193 A * | 12/2000 | Renz et al. | 324/318 |
| 6,160,489 A | 12/2000 | Perry et al. | |
| 6,162,174 A * | 12/2000 | Friemel | 600/447 |
| 6,162,190 A | 12/2000 | Kramer | |
| 6,193,657 B1 * | 2/2001 | Drapkin | 600/437 |
| 6,195,592 B1 | 2/2001 | Schuler | |
| 6,210,168 B1 * | 4/2001 | Aiger et al. | 434/262 |
| 6,219,032 B1 | 4/2001 | Rosenberg et al. | |
| 6,222,523 B1 | 4/2001 | Harvill et al. | |
| 6,239,784 B1 | 5/2001 | Holmes | |
| 6,264,609 B1 * | 7/2001 | Herrington et al. | 600/443 |
| 6,275,213 B1 | 8/2001 | Tremblay et al. | |
| 6,318,146 B1 * | 11/2001 | Madsen et al. | 73/1.86 |
| 6,323,837 B1 | 11/2001 | Rosenberg | |
| 6,346,940 B1 * | 2/2002 | Fukunaga | 345/427 |
| 6,413,229 B1 | 7/2002 | Kramer et al. | |
| 6,428,490 B1 | 8/2002 | Kramer et al. | |
| 6,497,672 B2 | 12/2002 | Kramer | |
| 6,544,041 B1 * | 4/2003 | Damadian | 434/262 |
| RE38,242 E | 9/2003 | Engel et al. | |
| 6,694,163 B1 * | 2/2004 | Vining | 600/407 |
| 6,876,891 B1 | 4/2005 | Schuler et al. | |
| 6,885,361 B1 | 4/2005 | Harvill et al. | |
| 6,939,138 B2 * | 9/2005 | Chosack et al. | 434/262 |
| 7,215,326 B2 | 5/2007 | Rosenberg | |
| 2002/0072814 A1 | 6/2002 | Schuler et al. | |
| 2002/0168618 A1 * | 11/2002 | Anderson et al. | 434/262 |
| 2002/0176619 A1 * | 11/2002 | Love | 382/154 |
| 2003/0112922 A1 * | 6/2003 | Burdette et al. | 378/65 |
| 2004/0034301 A1 * | 2/2004 | Falco | 600/427 |

FOREIGN PATENT DOCUMENTS

| | | | |
|---|---|---|---|
| EP | 0 393 683 | 10/1990 | |
| EP | 0 456 103 | 11/1991 | |
| EP | 0 489 469 | 6/1992 | |
| EP | 0 316 763 | 8/1992 | |
| EP | 0 567 215 | 10/1993 | |
| EP | 0 571 827 | 12/1993 | |
| EP | 0 624 861 | 11/1994 | |
| EP | 0 626 634 | 11/1994 | |
| EP | 0 623 066 | 7/1997 | |
| EP | 0 632 709 | 3/2002 | |
| FR | 2592514 A1 | 12/1985 | |
| GB | 2 195 808 | 4/1988 | |
| GB | 2 252 656 A | 8/1992 | |
| GB | 2 288 686 | 10/1995 | |
| JP | 03-98080 | 4/1991 | |
| WO | WO91/06935 | 5/1991 | |
| WO | WO 91/11775 | 8/1991 | |
| WO | WO 93/04625 | 3/1993 | |
| WO | WO 93/08517 | 4/1993 | |
| WO | WO 93/14483 | 7/1993 | |
| WO | WO 9318475 | 9/1993 | |
| WO | WO 94/25948 | 11/1994 | |
| WO | WO 95/02233 | 1/1995 | |
| WO | WO 9502233 A1 * | 1/1995 | G09B 23/28 |
| WO | WO95/10080 | 4/1995 | |
| WO | WO 95/32459 | 11/1995 | |
| WO | WO 96/16389 | 5/1996 | |
| WO | WO 9616389 A1 * | 5/1996 | G09B 23/28 |
| WO | WO96/28800 | 9/1996 | |
| WO | WO 99/38141 | 7/1999 | |
| WO | WO 9938141 A1 * | 7/1999 | G09B 23/28 |

OTHER PUBLICATIONS

M.L. Agronin. The Design of a Nine-String Six-Degree-of-Freedom Force-Feedback Joystick for Telemanipulation. pp. 340-348 Jet Propulsion Laboratory—California, LA.

Peter K Allen et al. Acquisition and Interpretation of 3-D Sensor Data from Touch Dept. of Computer Science, Columbia University, NY CH2813-4/89/0000/0033/$01.00 1989 IEEE pp. 33-40.

Fumihito Arai et al. Intelligent Assistance in Operation of Active Catheter for Minimum Invasive Surgery. Nagoya University—Nagoya, Japan Kinjo University—Nagoya, Japan IEEE International Workshop on Robot and Human Communication 0-7803-2002-6/94 $4.00 1994 IEEE.

Daniel Bachofen et al. Enhancing the Visual Realism of Hysteroscopy Simulation Book Series: Studies in Health Technology and Informatics—Book Medicine meets Virtual Reality 14: Accelerating Change in Health Care: Next Medical Toolkit vol. 119/2005 pp. 31-36.

J. Baille et al. Use of Computer Graphics Simulation for Teaching of Flexible Sigmoidoscopy. Duke University Medical Center, North Carolina, USA. Endoscopy 3 vol. May 23, 1991 pp. 126-129.

David Baraff An Introduction to Physically Based Modeling: Ridged Body Simulation II—Nonpenetration Constraints Robotics Institute Carnegie Mellon Institute pp. 32-68 1997.

Adelstein et al. ASME Symposium 1992 Design and Implementation of a Force Reflecting Manipuladum for Manual Control Research. CA, USA.

J.H. Anderson et al. Da Vinci: A Vascular Catheterization and Interventional Radiology-Based Training and Patient Pretreatment Planning Simulator (Abstract) JVIR Supplement, Journal of Vascular and Interventional Radiology, vol. 7, No. 1, Part 2. Jan.-Feb. 1996 Washington, US.

J. Batter and F. Brooks, Jr. Grope-1: A Computer Display to the Sense of Feel 1972 North Carolina, USA.

(56) References Cited

OTHER PUBLICATIONS

M. Bostrom et al. Design of an Interactive Lumbar Puncture Simulator With Tactile Feedback IEEE Neutral Network Counsel Virtual Reality Annual International Symposium Conference Sep. 18-22, 1993; Seattle, Washington U.S.
M. Bostrom Design of Hardware for Simulating Lumbar Puncture with Force Feedback Thayer School of Engineering, Dartmouth College. Mar. 17, 1993.
F. P. Brooks, et al. Project Grope—Haptic Displays for Scientific Visualization ACM, Computer Graphics, vol. 24, No. 4. Aug. 1990—Chapel Hill NC, USA.
G. Burdea and T. Speeter Nasa Portable Dextrous Force Feedback Master for Robot Telemanipulation (PDMFF) pp. 153-161 Technical Report Server (NTRS), NJ ,USA.
Burdea et al. A Distributed Virtual Environment with Dextrous Force Feedback Informatique '92, International Conference Interface to Real and Virtual Worlds, Rutgers University EC2 Conference Mar. 23-27, 1992, NJ, USA.
J. Capowski, Remote Manipulators as a Computer Input Device University Microfilms, A XEROX Company, Ann Arbor, Michigan UMI Dissertation Services. 1971—Michigan USA.
Cover et al. Interactively Deformable Models for Surgery Simulation (Object Modeling) Computer Graphics & Applications IEEE pp. 68-75 Atlanta, GA, USA.
J. S. Denson and S. Abrahamson A Computer-Controlled Patient Simulator Apr. 21, 1969—vol. 208, No. 3 pp. 504-508 LA, USA.
D. Gillies and C. Williams, London UK An Interactive Graphic Simulator for the Teaching of Fibrendoscopic Techniques Eurographics '87 Elsevier Science Publishers B.V North Holland pp. 127-138.
Gillies, Haritsis and Williams Computer Simulation for Teaching Endoscopic Procedures Endoscopy, Supplement II, vol. 24, Jul. 1992. pp. 455-550.
A. Haritsis D. Gillies Ch. Williams (Eurographics) Realistic Generation and Real Time Animation of Images of the Human Colon Computer Graphics Forum vol. II No. 3, conference issue—Sep. 7-11, 1992. NNC Blackwell.
Haritsis 1992 (Hellenic) A.Haritsis D. Gillies Ch. Williams Computer Simulation: New Horizons in Endoscopy Teaching Hellenic Journal of Gastroenterology 1992 pp. 54-63 London UK.
G. Higgins, et al. Higgins 1995 (Surg. Tech. Int'l IV) Virtual Reality Surgery: Implementation of a Coronary Angioplasty Training Simulator. University Medical Press, San Francisco, 1995. pp. 379-383.
D. Hon Ixion's Laparoscopic Surgical Skills Simulator Symposium: Medicine Meets Virtual Reality II Jan. 27-30, 1994 San Diego, USA.
D. Hon Ixion's Realistic Medical Simulations Virtual Reality World, vol. 2, No. 4 Jul./Aug. 1994 pp. 58-62.
H. Iwata Artificial Reality with Force-feedback: Development of Desktop Virtual Space with Compact Master Manipulator. ACM SIGGRPAH 1990 Computer Graphics & Interactive Techniques vol. 24, No. 4. pp. 165-170 Aug. 6-10, 1990.
B.G Jackson L.B Rosenberg Force Feedback and Medical Simulation IOS Press and Ohmsha Jan. 19-22, 1995 pp. 147-151—CA, USA.
P.J. Kilpatrick Kilpatrick Thesis 1976 pp. 11-27 The Use of a Kinesthetic Supplement in an Interactive Graphics System. The University of North Carolina, USA.
Kotoku et al. A Force Display System for Virtual Environments and its Evaluation International Workshop on Robot and Human Communication IEEE Sep. 1-3, 1992 pp. 246-251—Ibaraki, Japan.
U.G. Kuhnapfel Realtime Graphical Computer Simulation for Endoscopic Surgery Symposium: Medicine Meets Virtual Reality II Jan. 27-30, 1994 San Diego, CA, USA.
U.G.Kuhnapfel et al. Endo surgery simulations with KISMET: a flexible tool for surgical instrument design, operation room planning and VR technology based abdominal surgery training. Virtual Reality World '95, Conference Stuttgart, Germany Computerwoche Verlag, 1995. pp. 165-171.

B. Marcus Feedback Technology and Virtual Environments pp. 87-95 Jul. 1-3, 1992—1992 International Conference on Artificial Reality and Telexistence (ICAT 1992) pp. 87-95.
Mark et al. Adding Force Feedback to Graphics Systems: Issues and Solutions Aug. 4-9, 1996 ACM SIGGRAPH 1996 Computer Graphics Proceedings, Annual Conference Chapel Hill. North Carolina, Usa.
T.H. Massie Design of a Three Degree of Freedom Force-Reflecting Haptic Interface MIT, USA Thesis—pp. 6-38 May 18, 1993 Submitted May 17, 1993.
K.T. McGovern et al. The Virtual Clinic™, A Virtual Reality Surgical Simulator Symposium: Medicine Meets Virtual Reality II pp. 151-157 Jan. 27-30, 1994 San-Diego CA, USA.
D. Meglan Making Surgical Simulation Real ACM SIGGRAPH Computer Graphics pp. 37-39 Nov. 1996 Rockville, MD, USA.
Meglan et al. The Teleos Virtual Environment Toolkit for Simulation-Based Surgical Education Interactive Technology and the New Paradigm for Healthcare Proceeding of MMVR 3, IOS Press and Ohmsha pp. 346-351. Jan. 17-20, 1996 San-Diego CA, USA.
J. R. Merril The Future of Virtual Reality, Medicine, and the Information Superhighway Journal of Knowledge Engineering & Technology, vol. 7, No. 1 Spring 1994 pp. 33-35 MD, USA.
Merril et al. Photorealistic Interactive Three-Dimensional Graphics in Surgical Simulation Interactive Technology and the New Paradigm for Healthcare Proceeding of MMVR 3, IOS Press and Ohmsha pp. 244-252 Jan. 19-22, 1995 San Diego, USA.
Merril et al. Surgical Simulation Using Virtual Reality Technology: Design, Implementation, and Implications. Surgical Technology International III 1994 pp. 53-60. Published by Universal Medical Press, CA, USA.
Merril et al. Virtual Heart Surgery—Trade Show and Medical Education 1994 Virtual Reality World pp. 55-57 Jul./Aug. 1994 MD, USA.
Merril et al Cyber Surgery—Cutting Costs, Sewing Benefits The Virtual Reality Special Report, Miller Freedman Inc. Summer 1994 pp. 39-42 MD, USA.
Minsky et al. Feeling and Seeing: Issues in Force Display ACM 1990 pp. 235-243 CA, USA.
M.D. Noar N. Soehendra Endoscopy Simulation Training Devices Endoscopy 1992, vol. 24 pp. 159-166 Georg Thieme Vering Stuttgart. New York.
M.D. Noar Robotics Interactive Simulation of RCP Sphincterotomy and EGD, Endoscopy 1992, vol. 24, pp. 539-541 Supplement 2 Georg Thieme Vering Stuttgart. New York.
A. M. Noll Man-Machine Tactile Communication Polytechnic Institute of Brooklyn, Jun. 1971, pp. 1V-X111 and 1-87.
Ernest M. Otani Software Tools for Dynamic and Kinematic Modeling of Human Emotion Department of Computer & Information Science Technical Reports (CIS) University of Pennsylvania, Jul. 1989, pp. 1-74.
M. Ouh-Young Force Display in Molecular Docking UNC, The University of North Carolina at Chapel Hill 1990, pp. 1-369.
J. Peifer, et al. Medicine Meets Virtual Reality, Health Care in the Information Age Applied Virtual Reality for Simulation of Endoscopic Retrograde Cholangio-Pancreatography IOM Press, Proceedings of Medicine Meets Virtual Reality 4, San Diego, California, Jan. 17-20, 1996, pp. 36-42.
S. Pieper et al. Stereoscopic Displays and Applications II Virtual environment system for simulation of leg surgery SPIE vol. 1457, Feb. 25-27, 1991, pp. 188-197.
S. Pieper et al. Interactive Graphics for Plastic Surgery: A task-level analysis and Implementation 1992 ACM Computer Graphics Special Issue on 1992 Symposium on Interactive 3D Graphics, Cambridge, MA Mar. 29-Apr. 1, 1992, pp. 127-134.
D. Popa Simulation of Lumbar Puncture Procedure using Force Feedback in Virtual Environments Thayer School of Engineering, Dartmouth College, Hanover, New Hampshire, Jun. 1994, pp. 1-134.
Preminger et al. Medicine Meets Virtual Reality, Health Care in the Information Age Virtual Reality Surgical Simulation in Endoscopic Urologic Surgery IOM Press, Proceedings of Medicine Meets Virtual Reality 4, San Diego, California, Jan. 17-20, 1996, Chapter 19, pp. 157-163.

(56) References Cited

OTHER PUBLICATIONS

L.B Rosenberg, B.G Jackson Foot-Based Interfaces to Virtual Environments Using the Immersion Interface Box (TM) Virtual Reality and Persons With Disabilities, Second Annual International Conference, Jun. 8-10, 1994, pp. 145-148.
L.B Rosenberg "Virtual Fixtures"—Perceptual overlays enhance operator performance in telepresence tasks Stanford University, Aug. 1994. pp. 1-214.
M. A. Russo The Design and Implementation of a Three Degree of Freedom of Freedom Force Output Joystick MIT, May 11, 1990. pp. 1-131.
Salisbury et al. Haptic Rendering: Programming Touch Interaction with Virtual Objects Symposium on Interactive 3D Graphics, 1995 ACM, pp. 123-130.
S. S. Saliterman A Computerized Simulator for Critical-Care Training: New Technology for Medical Education Scientific session of the Mayo Medical School Alumni Society , Nov. 4, 1989, pp. 968-978.
B. Schmult et al. Application Areas for a Force-Feedback Joystick DSC vol. 49. Advances in Robotics, Mechatronics, and Haptic Interfaces ASME 1993, pp. 47-54.
Singh et al. Design of an Interactive Lumbar Puncture Simulator With Tactile Feedback IEEE International Conference on Robotics and Automation, May 8-13, 1994, pp. 1734-1739.
M. Stanley and J. Colgate Computer Simulation of Interacting Dynamic Mechanical Systems using Distributed Memory Parallel Processors ASME Winter Annual Meeting, Symposium on Haptic Interfaces for Virtual Environment and Teleoperator Systems, Nov. 8-13, 1992, pp. 55-61.
Sharon A. Stansfield Visually-Guided Haptic Object Recognition University of Pennsylvania 1987 UMI, pp. 1-216.
I. Sutherland The Ultimate Display for Production Proceedings of the IFIP Congress 1965, pp. 506-508.
D. Terzopoulos and D. Metaxas Dynamic 3D Models with Local and Global Deformations: Deformable Superquadrics IEEE Transactions on Pattern Analysis and Machine Intelligence, vol. 13, No. 7, Aug. 30, 1990, pp. 703-714.
Williams, Baillie, Gillies, Borislow and Cotton Teaching Gastrointestinal Endoscopy by Computer Simulation: a Prototype for Colonoscopy and ERCP Gastrointestinal Endoscopy vol. 36, No. 1., 1990, pp. 49-54.
C. M. Winey III Computer Simulated Visual and Tactile Feedback as an aid to Manipulator and Vehicle Control MIT, Jul. 31, 1981, pp. 1-132.
O.C Zienkiewicz The Finite Element Method McGraw-Hill Book Company (UK) Limited, 1977, pp. 677-757.
Beth A. Marcus Hands On: Haptic Feedback in Surgical Simulation Exos, Inc., Jan. 27-30, 1994, pp. SIMB 004163-SIMB 004174.
Virtual Reality and Medicine the Cutting Edge SIG Advanced Applications, Inc. Conference and Exhibition, Sep. 8-11, 1994, The New York Hilton.
Daane et al. A $100 Surgical Simulator for the IBM PC Interactive Technology and the New Paradigm for Healthcare Jan. 1995—pp. 79-80.
Higgins U.S. Army Medical Research Grant Annual Report entitled "Medical Simulation for Trauma Management" Grant No. DAMD 17-94-J-4470.
Strutz et al. 3-D Guided Endoscopic Surgery of Paranasal Sinusese Surgical Technology International IV, Oct. 1995, pp. 195-197.
Stone Haptic Human-Computer Interaction—Haptic Feedback: A Brief History from Telepresence to Virtual Reality Haptic Human-Computer Interaction, First International Workshop, Glasgow, UK Proceedings. Aug. 31-Sep. 1, 2000.
Loftin et al. A Virtual Environment for Laparoscopic Surgical Training Medicine Meets Virtual Reality II: Interactive Technology & Healthcare, Jan. 1994.
Durrani et al. Advanced Endoscopic Imaging: 3-D Laparoscopic Endoscopy Surgical Technology International III, Oct. 1994.
Johnston et al. Assessing a Virtual Reality Surgical Skills Simulator Stud Health Technol Inform. 1996; 29:608-17.

Sheridan Automatica the Journal of IFAC the International Federation of Automatic Control / Telerobotics. Automatica, vol. 25, No. 4, pp. 487-507.
Barfield et al Virtual Environments and Advanced Interface Design 1995 pp. 358-414.
Bejczy et al. Controlling Remote Manipulators Through Kinesthetic Coupling Computers in Mechanical Engineering Jul. 1983, pp. 48-60.
Beer-Gable Computer Assisted Training in Endoscopy (C.A.T.E.): From a Simulator to a Learning Station.Endoscopy 1992; 24:suppl. 2: pp. 534-538.
Kuenhapfel et al. CAD-Based Graphical Computer Simulation in Endoscopic Surgery Institute fur Angewandte Informatik, Kernforschumgszentr urn Karlsruhe Germany, Oct. 1994.
Campos et al. A Robotic Haptic System Architecture University of Pennsylvania, Dept. of Computer & Information Science Technical Reprot No. MS-CIS-00-51 1990.
Merril et al. Changing the Focus of Surgical Training Virtual Reality World, Mar./Apr. 1995, pp. 56-60.
Szabo et al. Choreographed Instrument Movements During Laparoscopic Surgery: Needle Driving, Knot Tying, and Anastomosis Techniques. Medicine Meets Virtual Reality II; Interactive Technology & Healthcare, Jan. 1994. pp. 216-217.
Dumay Cybersurgery Medicine Meets Virtual Reality II. Interactive Technology & Healthcare, Jan. 1994.
Greenleaf DataGlove and Datasuit: Virtual Reality Technology Applied to the Measurement of Human Movement. Medicine Meets Virtual Reality II. Interactive Technology & Healthcare, Jan. 1994, pp. 63-69.
Burdea et al. Dextrous Telerobotics with Force Feedback—An Overview, Part 1: Human Factors Rutgers—The State University of New Jersey, Dept. of Electrical and Computer Engineering, Robotica (1991) vol. 9, pp. 171-178.
Online reference dated May 31, 1995, updates chapter 13 of the AutoCAD Release 13 Developer's Guide dated Apr. 14, 1995.
Brochure: Dynacath Simulator Dynacath Minneapolis, MN.
Kuhn et al. Karlsruhe Endoscopic Surgery Trainer A "Virtual Reality" based Training System for Minimally Invasive Surgery.
Christensen Bringing Telematics Into Health Care in the European Communities Medicine Meets Virtual Reality II. Interactive Technology & Healthcare, Jan. 1994, 21-23.
Marcus et al. Exos Research on Master Controllers for Robotic Devices NASA Technical Reports Server NTRS, pp. 238-245 Jan. 1, 1992.
Merril VR for Medical Training and Trade Show "Fly-Pape": Virtual Reality World, May/Jun. 1994, pp. 53-57.
Burdea Force and Touch Feedback for Virtual Reality Electrical and Computer-Engineering Dept. Rutgers—The State University of New Jersey.
Baumann et al. Force Feedback for Virtual Reality Based Minimally Invasive Surgery Simulator Medicine Meets Virtual Reality IV: Health Care in the Information Age, Jan. 1996.
Burdea Chapter 7 Force and Touch Feedback for Virtual Reality Physical Modeling, John Wiley & Sons, Inc., pp. 168-223.
Jason Fritz Haptic Rendering Techniques for Scientific Visualization Jason P. Fritz Thesis at University of Delaware Fall 1996.
Marcus Hands On: Haptic Feedback in Surgical Simulation Exos Inc. 2 A Gill St. Woburn, MA.
Rosenberg et al. A Haptic Interface for Virtual Simulation of Endoscopic Surgery Medicine Meets Virtual Reality IV: Health Care in the Information Age, Jan. 1996 pp. 371-387.
Haritsis et al. Realistic Generation and Real Time Animation of Images of the Human Colon Computer Graphics Forum, vol. II, No. 3, pp. C367-380.
Ho et al. IGES and PDES, The Current Status of Product Data Exchange Status Dept. of Computer Science, Univ. of Mo-Rolla, Rolla MO, 1988 IEEE, pp. 210-216.
Hooper The Interactive Assembly and Computer Animation of Reconfigurable Robotic Systems Mechanical Engineering Dept. The University of Texas at Austin. 1990.

(56) References Cited

OTHER PUBLICATIONS

Rosenberg Louis B. Human Interface Hardware for Virtual Laparoscopic Surgery Interactive Technology and the New Paradigm for Health Care Immersion Corp. Santa Clara, CA. Chapter49, pp. 322—Jan. 1995.

Funda et al. Image-guided Command and Control of a Surgical Robot Medicine Meets Virtual Reality II. Interactive Technology & Healthcare, Jan. 1994.

Jaramaz et al. Integrating Finite Element Analysis Into Pre-Operative Surgical Planning and Simulation of Total Joint Replacement Surgery Medicine Meets Virtual Reality II. Interactive Technology & Healthcare, Jan. 1994, pp. 34-37.

Merck & Co. An Introduction to The Robotic Endoscopy Simulator 1989.

Hastreiter et al. Intuitive and Interactive Manipulation of 3D Datasets by Integrating Texture Mapping Based Volume Rendering into the Open Inventor Class Hierarchy Lehrstuhl fur Graphische Datenverarbeitung (IMMD9) Universitat Erlangen.

Issacs et al. Controlling Dynamic Simulation with Kinematic Constraints, Behavior Functions and Inverse Dynamics Computer Graphics vol. 21, No. 4, pp. 215-224.

Filerman et al. Issues in the Design of Tactile Input Devices for Mechanical CAD Systems Massachusetts Institute of Technology, Artificial Intelligence Laboratory 1989.

Artificial Reality with Force-feed back: Development of Desktop Virtual Space with Compact Master Manipulator Iwata Computer Graphics vol. 24, No. 4, pp. 165-170.

Hon Ixion's Laparoscopic Surgical Skills Simulator Medicine Meets Virtual Reality II. Interactive Technology & Healthcare, Jan. 1994.

Kilpatrick The use of a Kinesthetic Supplement in an Interactive Graphics System Xerox University Microfilms 1976.

Kuhnapfel et al. Endosurgery Simulations with KISMET Virtual Reality World, pp. 165-171 1995.

Immersion Corporation Laparoscopic Impulse Engine Impulse Engine 2000™ Software Development Kit (Ver. 1.0)(Immersion) Immersion Corporation—Version 1.0 Mar. 1995.

McKensie et al. Lasers in Surgery and Medicine Wessex Regional Medical Physics Service and Department of Otolaryngology, vol. 29, No. 6, pp. 619-641 1984.

Massie et al. The Phantom Haptic Interface: A Device for Probing Virtual Objects Proceedings of the ASME Winter Annual Meeting, Symposium on Haptic Interfaces for Virtual Environment and Teleoperator Systems, Chicago, IL Nov. 1994.

McAfee et al Teleoperator Subsystem-Telerobot Demonstrator: Force Reflecting Hand Controller Equipment Manual Jet Propulsion Laboratory, California Institute of Technology, pp. 3-11.

Poston et al. The Medical Reality Sculptor Medicine Meets Virtual Reality II. Interactive Technology & Healthcare, Jan. 1994. pp. 174-176.

Satava Medical Virtual Reality: The Current Status of the Future Medicine Meets Virtual Reality IV: Health Care in the Information Age, Jan. 1996.

Merril et al. Virtual Reality for Trade Shows and Individual Physician Training Virtual Reality Systems, pp. 40-44 Spring 2004.

Metaxas et al. Dynamic Deformation of Solid Primitives with Constraints Computer Graphics Proceedings, Annual Conference Series, University of Toronto. pp. 309-312.

Flynn Virtual Reality and Virtual Spaces Find a Niche in Real Medicine; Simulated Surgery on a Computer—This Won't Hurt. New York Times Jun. 5, 1995.

Massimo et al. One Handed Tracking in Six Degrees of Freedom IEEE International Conference on Systems, MAN and Cybernetics, Massachusetts Institute of Technology, Man-Machine Systems Laboratory, vol. 1 of III.

Hannaford et al. Performance Evaluation of a Six-Axis Generalized Force-Reflecting Teleoperator IEEE May/Jun. 1991, vol. 21, No. 3 pp. 620-633.

Merril Presentation Material: Medicine Meets Virtual Reality II. Interactive Technology & Healthcare, Jan. 1994.

Immersion Human Interface Corporation Immersion Probe and Personal Digitizer Programmer's Technical Reference Manual: Immersion Probe and Personal Digitizer May 19, 1994.

Durlach Psychophysical Considerations in the Design of Human-Machine Interfaces for Teleoperator and Virtual-Environment Systems Medicine Meets Virtual Reality II. Interactive Technology & Healthcare, Jan. 1994 pp. 45-47.

Hubner et al. Real-Time Volume Visualization of Medical Image Data for Diagnostic and Navigational Purposes in Computer Aided Surgery Proc., Computer Assisted Radiology, CAR'96 Paris, pp. 751-756 Jun. 26-29, 1996.

Merril et al. Revealing the Mysteries of the Brain with VR Virtual Reality Special Report, Winter 1994, pp. 61-65.

Neisius et al. Robotic Telemanipulator for Laparoscopy 1995 IEEE-EMBC and CMBEC Theme 5: Neuromuscular Systems/Biomechanics, pp. 1199-1200.1995.

Sato et at. Space Interface Device for Artificial Reality—SPIDAR System and Computers in Japan, vol. 23, No. 12, pp. 44-54.

Galyean et al. Sculpting: An Interactive Volumetric Modeling Technique Computer Graphics, vol. 25, No. 4.

Medical World News Virtual Reality Shapes Surgeon's Skills Medical World News, Feb. 1994, pp. 26-27.

Hon Tactile and Visual Simulation: A Realistic Endoscopy Experience Medicine Meets Virtual Reality: Discovering Applications for 3-D Multi-Media Interactive Technology in the Health Sciences, Jun. 4-7, 1992.

Johnson Tactile Feedback Enhancement to Laparoscopic Tools Medicine Meets Virtual Reality II. Interactive Technology & Healthcare, Jan. 1994.

Fischer et al. Tactile Feedback for Endoscopic Surgery Interactive Technology and the New Paradigm for Healthcare, Jan. 1995.

Peine et al. A Tactile Sensing and Display System for Surgical Applications Interactive Technology and the New Paradigm for Healthcare, Jan. 1995 pp. 283-288.

Computer Procedures for Finite Element Analysis Taylor Computer Procedures, The Finite Element Method, McCraw Hill, pp. 677-757 Computer Procedures for Finite Element Analysis.

Hunter et al. Teleoperated Microsurgical Robot and Associated Virtual Environment Medicine Meets Virtual Reality II. Interactive Technology & Healthcare, Jan. 1994.

Holler et al. Teleprescence Systems for Application in Minimally Invasive Surgery Medicine Meets Virtual Reality II. Interactive Technology & Healthcare, Jan. 1994.

Sheridan Telerobotics Automatica vol. 25, No. 4, pp. 487-507.

Satava Virtual Reality Surgical Simulator: The First Steps Medicine Meets Virtual Reality: Discovering Applications for 3-D Multi-Media Interactive Technology in the Health Sciences—Jun. 4-7, 1992.

Frolich et al. The Responsive Workbench: A Virtual Working Environment for Physicians Interactive Technology and the New Paradigm for Healthcare, Jan. 1995, pp. 118-119.

Doyle et al. The Virtual Embryo: VR Applications in Human Developmental Anatomy Medicine Meets Virtual Reality II: Interactive Technology & Healthcare, Jan. 1994, pp. 38-41.

Baille Gastrointestinal Endoscopy: Time for Change Scott Med J. Feb. 1989; 34 (1): 389-90.

Song et al. Tissue Cutting in Virtual Environments Interactive Technology and the New Paradigm for Healthcare, Jan. 1995.

Gyeong-Jae et al. Tissue Cutting in Virtual Environments Interactive Technology and the New Paradigm for Healthcare, Jan. 1995 359-364J.

Sukthankar Towards Virtual Reality of "Tissue Squeezing": A Feasibility Study Medicine Meets Virtual Reality II: Interactive Technology & Healthcare, Jan. 1994, pp. 182-186.

Adachi Touch and Trace on the Free-Form Surface of Virtual Object Proceedings of IEEE Virtual Reality Annual International Symposium—Sep. 18-22, 1993 Seattle, WA pp. 162-168.

Trevidi et al. Developing Sensor-Based Robotic System Using Virtual Reality Concepts Proceedings for the ANS Fifth Topical Meeting on Robotics and Robotic Systems Knoxsville, TN/Apr. 25-30, vol. 1, pp. 165-172.

CH Products CH Products Virtual Pilot Control Yoke 1993.

(56) References Cited

OTHER PUBLICATIONS

Henderson "Virtual Realities" as Instructional Technology Journal of Interactive Instruction Development, pp. 24-30.
Hoffman Virtual Reality and the Medical Curriculum: Integrating Extant and Emerging Technologies Medicine Meets Virtual Reality II: Interactive Technology & Healthcare, Jan. 1994 pp. 73-76.
Burdea et al. Virtual Reality Technology Chap. 6, pp. 221-242. Wiley-Interscience 2003.
Iwata et al. Volume Haptization IEEE 1993, pp. 16-18.
Anon. VR in Medicine VR News; Apr. 1996 vol. 5, Issue 3.
Ota et al. Virtual Reality in Surgical Education ComputBiol Med., Mar. 1995, 25(2): 127-37.
MacDonald et al. Virtual Reality Technology Applied to Anesthesiology Interactive Technology and the New Paradigm for Healthcare, Jan. 1995.
Bell et al. The Virtual Reality Modeling Language, version 1.0 Specification 1996.
Merril Why I Simulate Surgery . . . Virtual Reality World, Nov./Dec. 1994, pp. 54-57.

\* cited by examiner

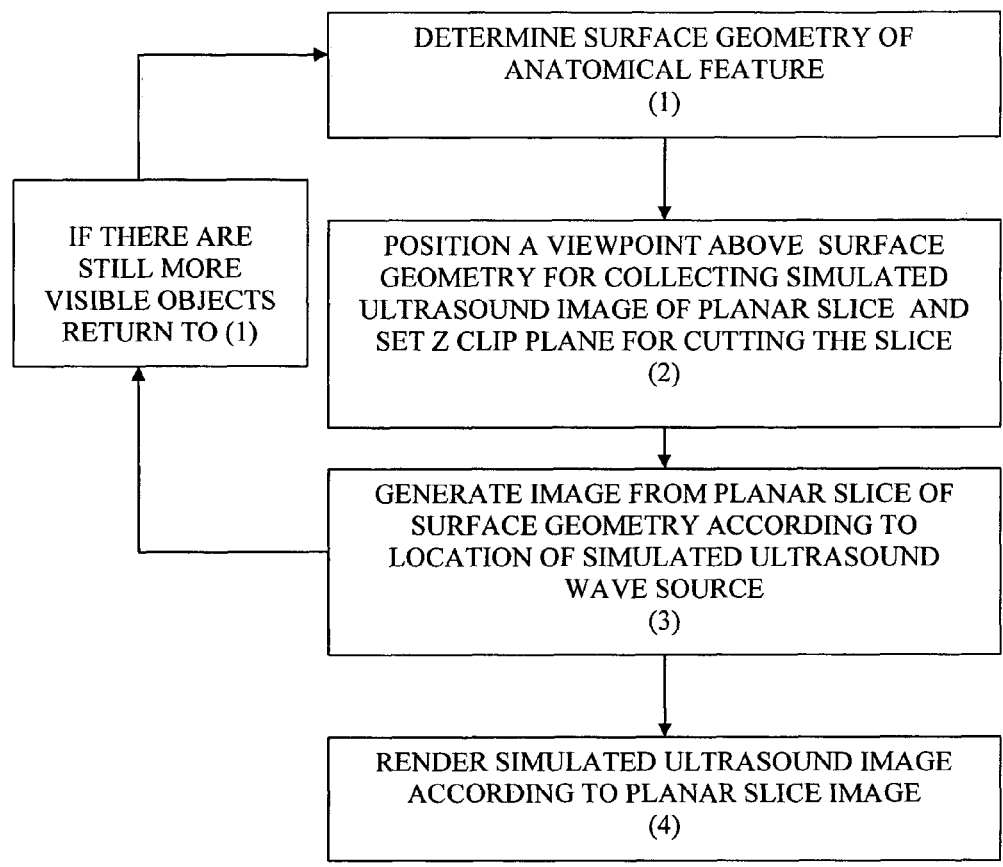

ENDOSCOPIC ULTRASONOGRAPHY SIMULATION

RELATED PATENT APPLICATIONS

This application is a National Phase Application of PCT/IL02/00393, International Filing Date 20 May 2002 which claims priority from Israel Patent Application No. 143255, filed 20 May 2001.

FIELD OF THE INVENTION

The present invention is of a method for simulating ultrasound images, and in particular, for such a method for simulating ultrasound images which are produced during a medical diagnostic procedure.

BACKGROUND OF THE INVENTION

ERCP (Endoscopic Retrograde Cholangio Pancreatography) is a minimally invasive procedure which allows the doctor to perform necessary treatments such as enlarging a bile duct opening, removing gallstones lodged in the bile duct, inserting a stent (drain) in the duct or taking a biopsy specimen.

A flexible fiber optic tube, called a duodenoscope, is passed through the mouth, esophagus and stomach into the duodenum, which is the first part of the small intestine. The duodenoscope is a thin, flexible tube with a tiny video camera and light at one side of the tip. The papilla, which is an opening where the bile and pancreatic ducts empty into the duodenum, is visually identified. A small plastic tube, or cannula, is passed through the duodenoscope into the papilla. X-ray dye is injected through the cannula into the ducts. X-rays are then taken to study the ducts. Any necessary treatments can be performed at this time.

This treatment scheme is somewhat similar to gastro-endoscopy, in which an endoscope is inserted through the rectum in order to examine the large colon, for example. In both cases, students are taught to perform such procedures according to the traditional model for medical education, in which students observe and assist more experienced physicians. Unfortunately, such observation alone cannot provide the necessary training for such complicated medical procedures. Students may also perform procedures on animals and human cadavers, neither of which replicates the visual and tactile sensations of a live human patient. Thus, traditional medical training is not adequate for modern technologically complex medical procedures.

In an attempt to provide more realistic medical training for such procedures, simulation devices have been developed which attempt to replicate the tactile sensations and/or visual feedback for these procedures, in order to provide improved medical training without endangering human patients. An example of such a simulation device is disclosed in U.S. Pat. No. 5,403,191, in which the disclosed device is a box containing simulated human organs. Various surgical laparoscopic procedures can be performed on the simulated organs. Visual feedback is provided by a system of mirrors. However, the system of both visual and tactile feedback is primitive in this device, and does not provide a true representation of the visual and tactile sensations which would accompany such surgical procedures in a human patient. Furthermore, the box itself is not a realistic representation of the three-dimensional structure of a human patient. Thus, the disclosed device is lacking in many important aspects and fails to meet the needs of a medical simulation device.

Attempts to provide a more realistic experience from a medical simulation device are disclosed in PCT Patent Application Nos. WO 96/16389 and WO 95/02233. Both of these applications disclose a device for providing a simulation of the surgical procedure of laparoscopy. Both devices include a mannequin in the shape of a human torso, with various points at which simulated surgical instruments are placed. However, the devices are limited in that the positions of the simulated surgical instruments are predetermined, which is not a realistic scenario. Furthermore, the visual feedback is based upon a stream of video images taken from actual surgical procedures. However, such simple rendering of video images would result in inaccurate or unrealistic images as portions of the video data would need to be removed for greater processing speed. Alternatively, the video processing would consume such massive amounts of computational time and resources that the entire system would fail to respond in a realistic time period to the actions of the student. At the very minimum, a dedicated graphics workstation would be required, rather than a personal computer (PC). Thus, neither reference teaches or discloses adequate visual processing for real time visual feedback of the simulated medical procedure.

Similarly, U.S. Pat. No. 4,907,973 discloses a device for simulating the medical procedure of flexible gastro-endoscopy. The disclosed device also suffers from the deficiencies of the above-referenced prior art devices, in that the visual feedback system is based upon rendering of video data taken from actual duodenoscopic procedures. As noted previously, displaying such data would either require massive computational resources, or else would simply require too much time for a realistic visual feedback response. Thus, the disclosed device also suffers from the deficiencies of the prior art.

A more useful and efficient medical simulation device for minimally invasive therapeutic procedures such as endoscopy is disclosed in PCT Application No. WO 99/38141, by the present inventors and incorporated by reference as if fully set forth herein. The disclosed medical simulation device provides real time, accurate and realistic visual feedback of general endoscopic procedures, as well as realistic tactile feedback, so that the visual and tactile systems are accurately linked for the simulation as for an actual medical procedure.

Duodenoscopy of the bilio-pancreatic system would also benefit from such realistic simulation, involving both visual and tactile feedback which are provided in an accurate manner. Bilio-pancreatic duodenoscopic procedures feature many of the same principles as gastro-endoscopy, since for both types of endoscopic procedures, an instrument is inserted into a body orifice, and must then be guided through a tubular organ without direct visual feedback. In addition, the physician performing the procedure must be able to correctly interpret both the indirect visual feedback provided through a video monitor, as well as the tactile feedback through the instrument itself. Therefore, both types of duodenoscopy require the physician to receive "hands-on" manual training for the correct performance of the procedure.

As part of the simulation of this procedure, the students should also be able to practice using the diagnostic tool of ultrasound. Ultrasonography is an optional adjunct to a large number of medical procedures, such as gastro-endoscopy and duodenoscopy. In addition, ultrasonography is itself an important medical procedure, which is used for example in order to safely visualize the fetus during pregnancy. Unfortunately, the background art does not feature suitable methods for accurately and efficiently simulating ultrasound images.

SUMMARY OF THE INVENTION

The background art does not teach or suggest a method and a system to efficiently and realistically simulate ultrasound images. Nor does the background art teach or suggest such a system and method for providing such images as part of the simulation of an overall medical procedure.

The present invention overcomes the deficiencies of the background art by providing a method and a system to simulate ultrasound images and hence for simulating the evaluation of a subject with such images as a diagnostic tool. For the purpose of simulating ultrasound images, these images may be considered to be planar slices of a given geometry. These slices are generated from the surface geometry of the portion of the subject which would receive the ultrasound waves if the ultrasound diagnostic procedure was actually being performed. Simulating such ultrasound images may therefore be performed by determining such images from surface models, and then rendering those ultrasound images at positions given by the tip of the scope. The rendering of such simulated ultrasound images also optionally and preferably includes the simulation of the "grainy" quality of such images.

According to the present invention, there is provided a method for simulating an ultrasound image of at least one anatomical feature of a subject, comprising: determining a surface geometry of the at least one anatomical feature; generating at least one planar slice of the surface geometry according to a location of a simulated source of ultrasound waves; and rendering the ultrasound image according to the at least one planar slice.

Hereinafter, the term "simulated medical procedure" refers to the simulation of the medical procedure as performed through the system and method of the present invention. Hereinafter, the term "actual medical procedure" refers to the performance of the medical procedure on an actual, living human patient with an actual medical instrument, such that the medical procedure is "real" rather than "simulated". Hereinafter, the term "corresponding actual organ" refers to the "real" organ of a human being or other mammal which is being simulated by the simulated organ of the present invention.

Hereinafter, the term "subject" refers to the human or lower mammal upon which the method and system of the present invention are performed or operated. Hereinafter, the term "student" refers to any human using the system of the present invention, being trained according to the present invention or being taught according to the present invention including, but not limited to, students attending medical school or a university, a medical doctor, a trained pancreatic specialist or other trained medical specialist.

BRIEF DESCRIPTION OF THE DRAWINGS

The foregoing and other objects, aspects and advantages will be better understood from the following detailed description of a preferred embodiment of the invention with reference to the drawings, wherein:

FIG. 6 is a flowchart showing an exemplary method of the present invention.

DETAILED DESCRIPTION OF PREFERRED EMBODIMENTS

Figure 1:
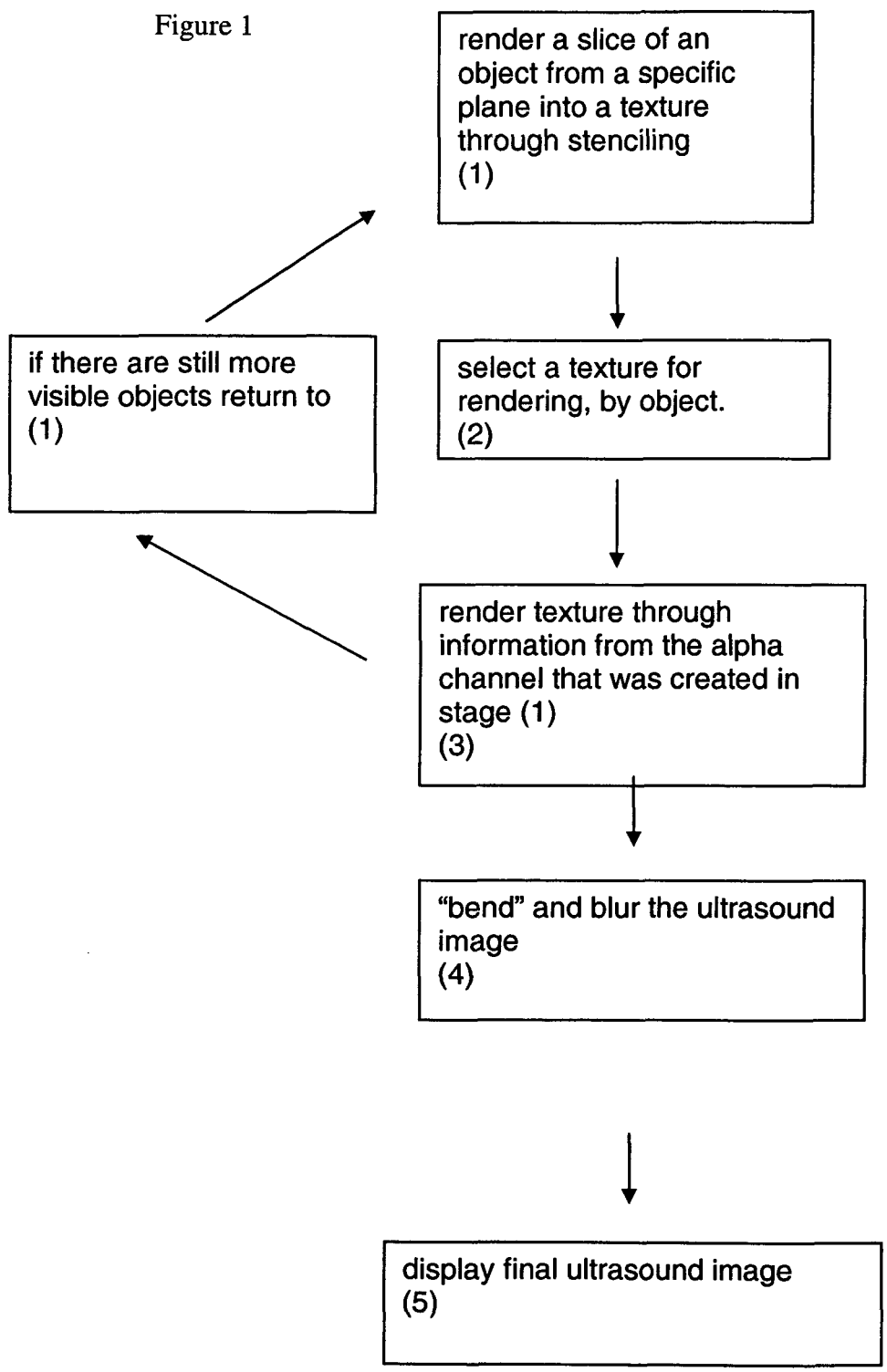
FIG. 1 is a flowchart of an exemplary method of the present invention.

The present invention is related to a method and a system for simulating ultrasound images and hence for simulating the evaluation of a subject with such images as a diagnostic tool. Preferably, but not necessarily, the ultrasound images are simulated as though they had been collected during the evaluation of a subject with gastro-endoscopy and/or duodenoscopy, although of course ultrasound images could optionally be simulated as though they had been collected during substantially any medical procedure.

For the purpose of simulating ultrasound images, these images may be considered to be planar slices of a given geometry. These slices are generated from the surface geometry of the portion of the subject which would receive the ultrasound waves if the ultrasound diagnostic procedure was actually being performed. This surface geometry may optionally be modeled as polygonal models or other surface representation, optionally and more preferably by using common 3D graphic accelerator functionality. Thus, a real-time performance to this simulation may optionally be obtained.

Simulating such ultrasound images may therefore be performed by determining such images from surface models, and then rendering those ultrasound images at positions given by the tip of the scope. Such rendering is similar to that currently performed for modeling regular endoscopy procedures, and is also known as a "movement model". One example of such a movement model is given in PCT Application No. WO 99/38141, filed on Jan. 15, 1999, which is hereby incorporated by reference as if fully set forth herein. This reference also describes an exemplary system for simulating a medical procedure, which could optionally be used with the present invention, for example. Of course, other systems and/or devices could also optionally be used with the method of the present invention.

The present invention differs from such methods of modeling visual data for gastro-endoscopic procedures in that additional areas of the subject, including additional organs and/or organ portions, must also be rendered, since ultrasound waves penetrate beyond the wall of the organ which actually contains the ultrasound probe.

The rendering of such simulated ultrasound images also optionally and preferably includes the simulation of the "grainy" quality of such images. This quality is inherent to the method of ultrasound itself, as it involves sending sound waves to the desired area of the subject and then listening to the echoes, in order to measure the time required for the echo to return. Of course, at least a portion of the actual signal would be attenuated, since not all of the sound waves are reflected by the tissue. The intensity of the echo is also measured to provide the "echoic property" of the object, in which white spots in an image are hyper-echoic, and black spots are hypo-echoic. The graininess of the image occurs since the sound waves reflect in all directions, so minor echoes that are reflected locations other than the organ being examined also return to the probe, causing static interference with the signal being measured. Such static interference then creates the grainy image.

The principles and operation of a method and a system according to the present invention for the simulation of the medical diagnostic procedure of ultrasound, may be better understood with reference to the drawings and the accompanying description, it being understood that these drawings are given for illustrative purposes only and are not meant to be limiting.

As shown in FIG. 6, the overall method of rendering a simulated ultrasound image described in the invention is seen in flowchart form. The first step is to determine the surface geometry of an anatomical object. Next (step 2), a viewpoint above the surface geometry and z clip plane are chosen. Utilizing the above data, the software then generates a planar slice image (step 3) of the three dimensional surface in accordance with the location of a simulated source of ultrasound waves. Additional surface geometries are determined now if necessary by repeating step 1. Finally, (Step 4) the simulated ultrasound image is rendered through the processing of the planar slice image through known techniques such as bending and blurring of the image, and may be in accordance with selected textures from an actual ultrasound procedure.

As shown with regard to FIG. 1, an exemplary method of the present invention for rendering ultrasound images is described. Although the explanation is given with regard to a simulation of a linear array probe, in which the plane of the scan is parallel to the shaft of the endoscope probe, the system could easily be used to simulate other types of US (ultrasound) scans, for example a radial scan in which the plane of the scan is perpendicular to the shaft of the endoscope. One of ordinary skill in the art could easily alter the simulation process in order to accommodate these differences between scanning devices.

First, a technique called "stenciling" is used to render a slice of an object from a specific plane into a texture (which is basically a bitmap or a digital picture). Stenciling is known in the art of real time graphics, and is also used to simulate shadows and create other real-time computer graphic effects, in conjunction with a stencil buffer. This technique is performed by positioning the viewpoint of a virtual "camera" above the desired plane, in the direction of the plane normal. Positioning of a virtual camera or viewpoint for generating three-dimensional computer graphics is achieved by giving the coordinates of the viewpoint in relation to the coordinates of the object being viewed, by using a standard coordinate system (such as that of the X, Y & Z Axes for example).

The near Z clip plane is then set to fit the cutting plane. The near Z clip plane is the distance from the camera at which objects begin to be seen, such that objects closer than that distance are clipped or not shown. The requirement for the near Z clip plane in the background art is due to mathematical inaccuracies in computers, as objects cannot to come infinitely close to the camera. However, for the purposes of the present invention, this parameter is preferably set at a specific location in order to cause the object to be cut at a specific plane, in order to be able to render the ultrasound image at that plane. This parameter could optionally be set in any type of three-dimensional (3D) rendering software to cause the object to be so clipped. The general function of a near Z clipping plane is to remove all the geometry that is closer to the camera than to that plane.

Figure 2:
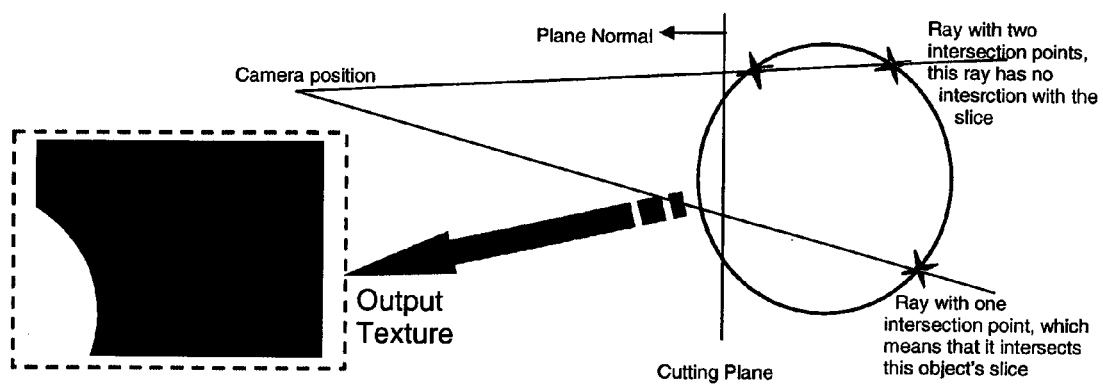
FIG. 2 is a flow diagram for determining the output texture for ultrasound images according to the present invention.

Next, both sides of the surface of the whole object are preferably rendered. All the surfaces of the object are rendered, even those which are not seen such as those which are removed from view, for example in the event that a near Z clipping plane has been applied. When the object is rendered, the stencil buffer associated with that software is preferably used to count the amount of pixels written to the buffer. If an even amount of pixels are written, the slice is not visible, and if an odd number of pixels are written, the slice is visible, as shown with regard to FIG. 2. This effect occurs because both sides are rendered, but with different parameters. For those portions of the object which should not be displayed (such as the back part of an object, which could not be seen from the perspective of the user), each time a pixel is written to the image buffer, the stencil value for this pixel is incremented. For those portions which should be displayed, the value in the stencil buffer is decreased by one. The stencil buffer is therefore a bitmap of 0 and 1 values, in which values of "1" indicate where this object intersects the ultrasound image plane.

Figure 3:
FIG. 3 shows exemplary ultrasound texture which is simulated according to the present invention.

A texture is then preferably selected which resembles the texture of the ultrasound image for the desired object, which could optionally be extracted from real ultrasound images of the organ or other tissue, such as images of the liver for example. Next, this texture is rendered by using the previously defined information from each slice as the alpha channel. The alpha channel is another color channel which is added frequently in 3D graphics and computer graphics generally, in addition to the common Red/Green/Blue channels (or color components). The alpha channel is related to the amount of transparency of the color. The data of the fourth channel is then preferably applied to all graphic components containing color. With regard to FIGS. 2 and 3, the alpha channel is used to determine which areas of the simulated images below are transparent.

With regard to the texture, in order to add visual realism to those portions of image in the previously described stencil buffer, texture is preferably added to those portions of the image having values of "1" in that buffer. For the purposes of this description, the texture is preferably added in grayscale, although of course colors could optionally be added.

Figure 4:
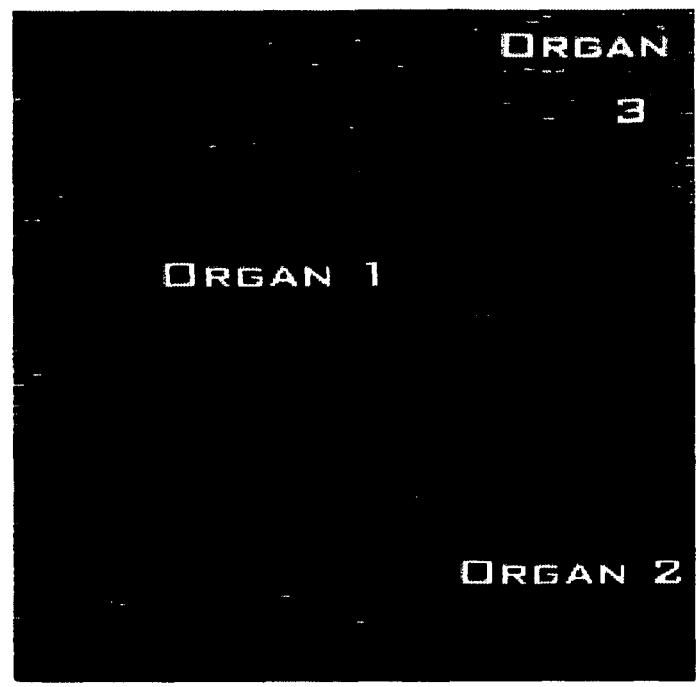
FIG. 4 shows labeled exemplary organ slices, visualized through ultrasound, which are simulated according to the present invention.

These steps are preferably performed for each object separately until all visible object slices are rendered, resulting in a simulated image as shown below with regard to FIG. 4. The image is then preferably "bent" and blurred to simulate the poor resolution of true ultrasound images. The process of "bending" the image is more preferably performed mathematically, while blurring may optionally and more preferably be performed through image processing which also involves a mathematical function, and which is also very well known in the art.

Figure 5:
FIG. 5 shows an exemplary final ultrasound image, simulated according to the method of the present invention.

All the work done previously is rendered to a surface that is not visible to the user, such that there is now a rectangular picture that represents slices of all the objects that intersected the US plane. If it is taken into consideration that the US probe is not straight, but is in fact an array of sensors in the shape of an an arc, the resulting image should be in the shape of a sector circumscribed by an arc parallel to the base arc of the sector. To obtain this image the rectangular picture is rendered onto a template in the shape of a sector as described above, in which the template is a polygonal model that describes the ultimate overall shape of the image. The result of these processes is shown in the exemplary image of FIG. 5.

After these processes have been performed, the relevant anatomy has been modeled onto surface models of the anatomical feature, such as the organ. Each object has been rendered with the associated ultrasound properties, such as how the tissue responds to ultrasound waves in terms of echoing, and with a sample of the correct filling texture for simulation of the ultrasound image. For example, since moving the endoscope or other tool which holds the probe also alters the probe's position, the position of the cutting plane may be altered with each movement. In turn, the slices generated by the cutting plane are changed, such that a new ultrasound image is formed. The final simulated ultrasound image is then displayed to the user (see FIG. 5 for an example).

As previously described, one of ordinary skill in the art could easily adjust the method of the present invention in order to accommodate different types of ultrasound scanning technologies. For example, for a radial scanning the device, the image would only have "blur" added, but would not be "bent", because the plane of scanning is perpendicular to the device. Also, the image would be round rather than square.

It will be appreciated that the above descriptions are intended only to serve as examples, and that many other embodiments are possible within the spirit and the scope of the present invention.

What is claimed is:

1. A computer-implemented method for simulating an ultrasound image of at least one anatomical feature of a subject, the method comprising:
    modeling, by a computer, a surface geometry of the at least one anatomical feature as a polygonal representation within a polygonal surface model;
    based on the surface geometry, generating, by the computer, an image of at least one planar slice of said surface geometry based on a location of a simulated source of ultrasound waves and the polygonal surface geometry of a portion of the subject which would receive ultrasound waves if an ultrasound diagnostic procedure was actually being performed;
    based on the image of said at least one planar slice, rendering, by the computer, the simulated ultrasound image according to said image of said at least one planar slice as part of a simulation of an endoscopic medical procedure, wherein rendering the simulated ultrasound image includes simulating echoes reflected from tissue of the anatomical feature, and adding to the image a filling texture; and
    displaying, by the computer, the rendered image to a user.

2. The method of claim 1, wherein said generating the image is performed by using a stencil buffer by:
    positioning a viewpoint for collecting the simulated ultrasound image above said planar slice; and
    setting a near Z clip plane to fit a cutting plane for cutting said planar slice.

3. The method of claim 2, wherein said generating with said stencil buffer is further performed by:
    setting a value for pixels for said planar slice to a positive value, and a value of pixels for the remainder of the anatomical feature to a zero value; and
    rendering said pixels.

4. The method of claim 2, wherein said generating with said stencil buffer is further performed by:
    determining at least one intersection of the anatomical feature with said planar slice; and
    setting a value for said pixels in said planar slice to a positive value for said stencil buffer.

5. The method of claim 1, wherein the simulated ultrasound image is a grayscale image and wherein said filling texture is collected from an actual ultrasound medical procedure.

6. The method of claim 1, wherein the simulated ultrasound image is a black and white image, and wherein said filling texture is collected from an actual ultrasound medical procedure.

7. The method of claim 5, wherein said generating the image is performed by using a stencil buffer and wherein said rendering with said filling texture is only performed for pixels in said stencil buffer having a positive value.

8. The method of claim 7, wherein said pixels having said positive value are white pixels.

9. The method of claim 5, wherein the simulated ultrasound image is created by rendering said filling texture on said planar slice image.

10. The method of claim 9, wherein rendering said filling texture further comprises at least one of bending and blurring said simulated image.

11. The method of claim 10, wherein said bending further comprises: rendering said simulated image onto a template, said template comprising a polygonal model constructed according to a shape of an image from an actual ultrasound medical procedure.

* * * * *